United States Patent [19]
Asberg

[11] 3,940,194
[45] Feb. 24, 1976

[54] WHEEL BEARING APPLICATION OF DRIVEN WHEELS FOR MOTOR VEHICLES

[75] Inventor: Sture Lennart Åsberg, Partille, Sweden

[73] Assignee: SKF Nova AB, Goteborg, Sweden

[22] Filed: Nov. 5, 1973

[21] Appl. No.: 413,120

[30] Foreign Application Priority Data
Nov. 6, 1972 Sweden.............................. 14307/72

[52] U.S. Cl. ................ 308/236; 293/361; 308/188; 403/164
[51] Int. Cl.² .......................................... F16C 33/30
[58] Field of Search ........ 308/236, 233, 235, 187.1, 308/189 R; 293/36 A, 36 R; 403/164, 165

[56] References Cited
UNITED STATES PATENTS

| | | | |
|---|---|---|---|
| 2,855,251 | 10/1958 | McNicoll | 308/236 |
| 3,112,965 | 12/1963 | Popiel | 308/236 |
| 3,304,139 | 2/1967 | Toth et al. | 308/236 |
| 3,395,956 | 8/1968 | Fisher | 308/236 |

FOREIGN PATENTS OR APPLICATIONS
679,724  12/1972  Italy ..................... 308/236

Primary Examiner—M. Henson Wood, Jr.
Assistant Examiner—Richard A. Bertsch
Attorney, Agent, or Firm—Daniel M. Rosen

[57] ABSTRACT

Wheel bearing application, including same for a wholly unloaded, rigid rear shaft, comprising drive means arranged in a sleeve portion for transferring torsional movement from a drive shaft and a bearing consisting of a moment-carrying, play-adjusted, rigid inner-ring-rotated roller bearing. The inner ring comprises two directly adjacent separate rings that are fitted on the sleeve portion and an outer ring of one piece, with rolling bodies arranged between the inner and outer rings.

2 Claims, 1 Drawing Figure

U.S. Patent  Feb. 24, 1976  3,940,194
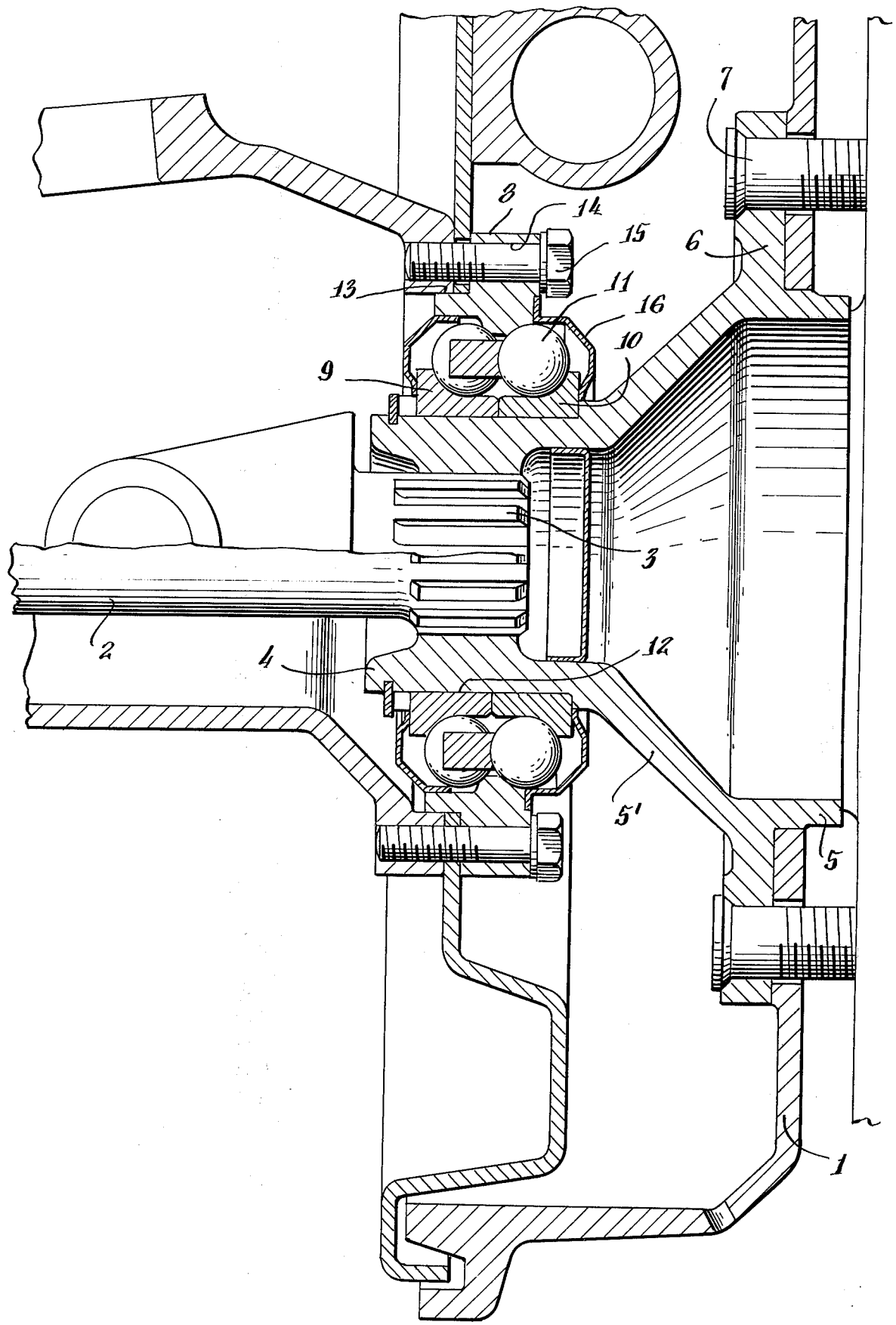

WHEEL BEARING APPLICATION OF DRIVEN WHEELS FOR MOTOR VEHICLES

The present invention relates to a wheel bearing application for a driven wheel of a motor vehicle, preferably a construction with rigid rear shaft.

Now existing, conventional constructions within this field comprise a relatively large number of parts which are so dimensioned that the construction is space consuming and heavy. In general two conical roller bearings are used in these constructions and, as a result, the bearings after mounting have to be adjusted regarding play and relubricated. It is also necessary to have the bearing outer ring rotatable and accessible from the front side in order to make it possible to perform the above-mentioned adjustment.

The above-mentioned disadvantages are avoided in the now proposed wheel bearing application, which is built up in a simple manner with a few parts and with a bearing type which makes the construction light and which requires little space. The chosen bearing is a moment carrying, angular contact double row bearing or a double row taper roller bearing, which during the manufacturing stage is given a certain, desired play.

Besides the earlier indicated advantages it is also possible, due to the very short, axial extension of the construction, to extend the construction radially without any special cost increase and to use this simple type of bearing for heavier vehicles. The above-mentioned radial extension makes it also possible to use a hollow shaft in order to reduce the total weight of the construction.

The construction can in principle be used to advantage for other types of driven wheels, front as well as rear wheels. Owing to the compact axial design, the drive joint can be provided with a very short stub axle. At the same time, the distance between the drive joint center and the wheel center can be reduced, which very often is desirable. The construction as such makes it also possible to use floating splines.

Contrary to conventional constructions, the construction in accordance with the invention is so shaped that the inner ring of the bearing rotates. This is novel in connection with for instance a wholly unloaded, rigid rear shaft construction. As to the fact that it is not necessary to adjust the bearing regarding play and not to relubricate, it is not necessary that the bearing be easily accessible. This fact has in accordance with the invention been used, contrary to known constructions, so that the inner ring is given the rotating function.

The invention will now be described more in detail with reference to the accompanying drawing in which the FIGURE shows a longitudinal section through a wheel bearing application in accordance with the invention. The upper part shows a rear wheel and the lower part a front or rear wheel.

The brakes, such as for use in heavier vehicles, consist in general of drum brakes and in the drawing the drum 1 is shown but not the brake blocks. The wholly unloaded drive shaft 2 is provided with splines 3 by means of which only a wholly unloaded drive influencing force, i.e. the torsional moment, is transferred. The end part of the splines on the drive shaft is fitted into the sleeve portion 4 of a flange sleeve 5. The flange portion 6 of the flange sleeve is by means of bolts 7 united to the drum 1 to which the vehicle wheel, not shown here, is fixed. The sleeve and the flange portions are integrated by a web portion 5'. The bearing of the proposed application consists in the embodiment shown of an outer ring 8 and two inner rings 9, 10 and there between are arranged rolling bodies in the form of balls 11 in two rows. The invention is not restricted to this type of bearing but instead of a ball bearing it is possible to use a taper roller bearing. The outer ring 8 shaped in one piece has a cross section shape such that it is very rigid against strains of different kinds. The inner rings 9, 10 are fitted onto a bearing seating 12 on the sleeve portion 4. In the example shown, the outer ring is provided with a supporting shoulder 13 and holes 14 for bolts 15. The raceways of the bearing rings are so shaped that the bearing is of angular contact type, which means that the ball loads are directed at an angle against the shaft center, whereby the great axial loads which occur on a vehicle wheel can be carried. The bearing is provided with seals 16 of a suitable type. By means of the now described bearing type, a light and compact unit is obtained and no parts are extending outside the drum 1.

The above described embodiment is only one example since the invention might be varied in more ways within the scope of the claimed invention.

What is claimed is:

1. A wheel bearing assembly, including same for a wholly unloaded, rigid rear shaft, comprising:
   a. a sleeve portion;
   b. drive means disposed in said sleeve portion, said drive means being adapted to transfer torsional moment from a drive shaft through a plurality of splines on said shaft which floatably engage the inner portion of said sleeve; and
   c. a bearing disposed about said sleeve portion and comprising a moment-carrying, play-adjusted, inner-ring-rotated rolling bearing, said bearing comprising an inner ring member comprising two separate rings disposed directly adjacent to each other, and fitted on said sleeve portion, said two separate rings secured together on said sleeve portion between first and second axially spaced apart means located on said sleeve portion at opposite sides of said separate inner rings, said inner bearing rings being axially fixed in position relative to said sleeve independent of axial movement of said shaft, and a one-piece outer ring and rolling bodies disposed between said inner and outer rings.

2. A wheel bearing assembly as in claim 1, wherein said outer ring comprises bolt holes whereby said outer ring can be connected to further parts of said wheel.

* * * * *